(12) United States Patent
Baba

(10) Patent No.: US 8,260,316 B2
(45) Date of Patent: Sep. 4, 2012

(54) MOVEMENT DISTANCE FALSIFICATION PREVENTING SYSTEM AND METHOD

(75) Inventor: Naruatsu Baba, Tokyo (JP)

(73) Assignee: COLOPL, Inc., Tokyo (JP)

( * ) Notice: Subject to any disclaimer, the term of this patent is extended or adjusted under 35 U.S.C. 154(b) by 0 days.

(21) Appl. No.: 13/264,268

(22) PCT Filed: Apr. 13, 2010

(86) PCT No.: PCT/JP2010/056597
§ 371 (c)(1),
(2), (4) Date: Oct. 13, 2011

(87) PCT Pub. No.: WO2010/119866
PCT Pub. Date: Oct. 21, 2010

(65) Prior Publication Data
US 2012/0040692 A1  Feb. 16, 2012

(30) Foreign Application Priority Data
Apr. 13, 2009 (JP) .................................. 2009-113038

(51) Int. Cl.
*H04W 24/00* (2009.01)
(52) U.S. Cl. ............... 455/456.1; 455/456.2; 455/456.3; 455/456.4; 455/404.1; 455/404.2
(58) Field of Classification Search .... 455/456.1–456.4, 455/404.1–404.2, 41.2
See application file for complete search history.

(56) References Cited

U.S. PATENT DOCUMENTS

| | | | |
|---|---|---|---|
| 2003/0114169 A1* | 6/2003 | Okamura et al. | 455/456 |
| 2004/0110514 A1* | 6/2004 | Kim et al. | 455/456.1 |
| 2005/0043037 A1* | 2/2005 | Ioppe et al. | 455/456.1 |
| 2005/0043039 A1* | 2/2005 | Ohta et al. | 455/456.1 |
| 2009/0117916 A1* | 5/2009 | Jo | 455/456.1 |
| 2011/0070896 A1* | 3/2011 | Persico | 455/456.1 |

FOREIGN PATENT DOCUMENTS

| | | |
|---|---|---|
| JP | 7-046661 A | 2/1995 |
| JP | 2002-304563 A | 10/2002 |

(Continued)

OTHER PUBLICATIONS

International Search Report of PCT/JP2010/056597, mailing date May 18, 2010.

*Primary Examiner* — Kamran Afshar
*Assistant Examiner* — Manpreet Matharu
(74) *Attorney, Agent, or Firm* — Westerman, Hattori, Daniels & Adrian, LLP (57) ABSTRACT

Improper acquisition of position information is prevented in a system in which points are added according to a movement distance of a user owning a cellular phone terminal. Position information of a cellular phone and the time information corresponding thereto are acquired on the basis of GPS or base station information. The movement distance and movement speed are calculated for each predetermined time interval, and whether or not the movement is within a range allowed for the corresponding transportation mode is determined on the basis of these position information and movement speed with reference to the mobile body database where timetables or the like have been recorded. The acquisition of the position information is determined to be improper when the movement is not in the range allowed for any of the transportation modes.

8 Claims, 9 Drawing Sheets

FOREIGN PATENT DOCUMENTS

| | | | |
|---|---|---|---|
| JP | 2002301563 | * | 10/2002 |
| JP | 2003-256979 A | | 9/2003 |
| JP | 2004-013730 A | | 1/2004 |
| JP | 2005-107876 A | | 4/2005 |
| JP | 2005107876 | * | 4/2005 |
| JP | 2006-304193 A | | 11/2006 |
| JP | 2009-038586 A | | 2/2009 |

* cited by examiner

USER TABLE

| MP NO. | T1 | GP1 | T2 | GP2 | L | POINT | ACCUMULATED POINTS |
|---|---|---|---|---|---|---|---|
| 1019765 | 13:00 | XXXX | 14:00 | YYYY | 14000 | 14 | 2563 |
| ⋮ | ⋮ | ⋮ | ⋮ | ⋮ | ⋮ | ⋮ | ⋮ |

|  | COORDINATES (x, y) | LINE 1 (TIME) | LINE 2 (TIME) | LINE 3 (TIME) |
|---|---|---|---|---|
| STATION A | (35.6257, 139.72386) | 15:00···ⓐ | 15:15 | 15:30 |
| STATION B | (36.6359, 139.73141) | 15:15···ⓑ | 15:30 | 15:45 |
| STATION C | (35.6589, 139.7454) | 15:30···ⓒ | 15:45 | 16:00 |
| STATION D | (35.6505, 139.7314) | 15:45···ⓓ | 16:00 | 16:15 |

| USER ACQUISITION POSITION INFORMATION TABLE | | | |
|---|---|---|---|
| 141411 | 506234 | N39.16.51.6E140.37.14.844 | 2009-02-11 23:12:02 |
| 141446 | 506154 | N39.17.26.973E140.35.54.644 | 2009-02-11 23:12:16 |
| 141411 | 506234 | N39.16.51.6E140.37.14.844 | 2009-02-11 23:12:25 |
| 141411 | 506234 | N39.16.51.6E140.37.14.844 | 2009-02-11 23:12:33 |
| 141446 | 506154 | N39.17.26.973E140.35.54.644 | 2009-02-11 23:12:56 |
| 141411 | 506234 | N39.16.51.6E140.37.14.844 | 2009-02-11 23:13:04 |
| 141411 | 506234 | N39.16.51.6E140.37.14.844 | 2009-02-11 23:13:13 |
| 141446 | 506154 | N39.17.26.973E140.35.54.644 | 2009-02-11 23:13:45 |
| 141411 | 506234 | N39.16.51.6E140.37.14.844 | 2009-02-11 23:13: 57 |
| 141446 | 506154 | N39.17.26.973E140.35.54.644 | 2009-02-11 23:14:15 |
| 141411 | 506234 | N39.16.51.6E140.37.14.844 | 2009-02-11 23:14:22 |
| 141446 | 506154 | N39.17.26.973E140.35.54.644 | 2009-02-11 23:14:34 |
| 141411 | 506234 | N39.16.51.6E140.37.14.844 | 2009-02-11 23:14:43 |
| 141446 | 506154 | N39.17.26.973E140.35.54.644 | 2009-02-11 23:14:58 |
| 141411 | 506234 | N39.16.51.6E140.37.14.844 | 2009-02-11 23:15:06 |

Rows D1–D6 correspond to the first seven entries.

```
timestamp: 3271
latitude:  40.798645454284944
longitude: -73.95300060510635
accuracy:  500 timestamp: 6886
latitude:  40.798645454284944
longitude: -73.95300060510635
accuracy:  500 timestamp: 7451
latitude:  40.798645454284944
longitude: -73.95300060510635
accuracy:  500 timestamp: 9236
latitude:  40.798645454284944
longitude: -73.95300060510635
accuracy:  500 timestamp: 11103
latitude:  40.798645454284944
longitude: -73.95300060510635
accuracy:  500
```

FIG. 9

```
timestamp: 9285
latitude:  35.64686316
longitude: 139.70857173
accuracy:  136 timestamp: 10277
latitude:  35.64686316
longitude: 139.70857173
accuracy:  136 timestamp: 12226
latitude:  35.64686316
longitude: 139.70857173
accuracy:  136 timestamp: 12236
latitude:  35.64686316
longitude: 139.70857173
accuracy:  136 timestamp: 12282
latitude:  35.64635915164819
longitude: 139.70705360562678
accuracy:  69.71482516045164
```

MOVEMENT DISTANCE FALSIFICATION PREVENTING SYSTEM AND METHOD

FIELD

The present invention relates to a movement distance falsification preventing technique for a portable terminal equipped with position recognition means such as a GPS.

BACKGROUND

Games using a cellular phone terminal equipped with a GPS (Global Positioning System) have recently attracted attention. In the location game "Ichige" (registered trade name, No. 5302412 of COLOPL Inc.) of this kind, position information (latitude, longitude) is acquired for each predetermined time interval, the movement distance is calculated on the basis of a difference in position information between a large number of locations, and incentives such as points corresponding to the movement distance of the user that owns the cellular phone terminal are added.

Such location game "Ichige" (registered trade name, No. 5302412 of COLOPL Inc.) will apparently also generate a business of converting the points that have been acquired correspondingly to the movement distance into virtual currency for Internet purchases or mileage for transportation means. Therefore, it is necessary that the movement distance be calculated correctly.

A system for adding mileage points is disclosed in Japanese Patent Application Publication No. 2002-304563 (Patent Document 1).

Patent Document 1: Japanese Patent Application Publication No. 2002-304563

However, some users can perform fraudulent acts of intentionally extending the measured distance of the position information and acquiring a large travel distance by using poor reception (out-of-range) of the cellular phone terminal or by operating the movement distance by falsifying parameters assigned to the position information. Patent Document 1 does not address this issue.

SUMMARY

The present invention has been created to resolve the above-described problem, and it is a technical object thereof to prevent fraudulent acquisition of movement distance in view of the future business associated with the location game "Ichige" of this kind.

The present invention uses the below-described means in order to resolve the aforementioned problem.

The invention as in claim 1 of the present application provides a movement distance falsification preventing system for a system in which points are added according to a movement distance of a user owning a portable terminal, the movement distance falsification preventing system comprising a position information acquisition unit which acquires position information of the portable terminal, a time information acquisition unit which acquires time information, a movement distance calculation unit which successively acquires position information from the position information acquisition unit for each predetermined time interval on the basis of the time information obtained from the time information acquisition unit and calculates a movement distance, and a determination unit which determines whether movement is within a range allowed for a transportation mode assumed on the basis of at least one type of information from among the position information, time information, and the calculated movement distance, wherein when the determination unit determines that the calculated movement distance is not within the range allowed for each of the transportation modes, the determination unit determines that the movement distance is improper.

With such a system, it is possible to check, on the basis of position information, time information, movement distance, and the like, whether data falsification is performed with a malicious intent. Therefore, inappropriate data operation by the user can be prevented and a game of competing on the movement distance can be realized fairly and impartially.

The invention as in claim 2 of the present application provides the movement distance falsification preventing system according to claim 1, wherein the determination unit further detects whether or not same or close values of a parameter to be added to the position information obtained from the position information acquisition unit appear repeatedly for every predetermined number of information acquisitions, and determines that the movement distance is improper when the repeated appearance of same or close values has been detected.

With such a configuration, falsification performed by the user with a malicious intent can be easily revealed by focusing attention on the repetition of same or close values of the parameter.

The invention as in claim 3 of the present application provides a movement distance falsification preventing method in a system in which points are added according to a movement distance of a user owning a portable terminal, the method including acquiring position information of the portable terminal by a position information acquisition unit, acquiring time information by a time information acquisition unit, acquiring successively position information for each predetermined time interval on the basis of the time information and calculating a movement distance by a movement distance calculation unit, and determining, by a determination unit, whether movement is within a range allowed for a transportation mode assumed on the basis of at least one type of information from among the position information, time information, and the calculated movement distance, and determining that the movement distance is improper when the calculated movement distance is determined not to be within the range allowed for each of the transportation modes.

With such a method, it is possible to check, on the basis of position information, time information, movement distance, and the like, whether data falsification is performed with a malicious intent. Therefore, inappropriate data operation by the user can be prevented and a game of competing on the movement distance can be realized fairly and impartially.

The invention as in claim 4 of the present application provides a movement distance falsification preventing program in a system in which points are added according to a movement distance of a user owning a portable terminal, the program implementing acquiring position information of the portable terminal by a position information acquisition unit, acquiring time information by a time information acquisition unit, acquiring successively position information for each predetermined time interval on the basis of the time information and calculating a movement distance by a movement distance calculation unit, and determining, by a determination unit, whether movement is within a range n allowed for a transportation mode assumed on the basis of at least one type of information from among the position information, time information, and the calculated movement distance, and determining that the movement distance is improper when the calculated movement distance is determined not to be within the range allowed for each of the transportation modes.

With such a program, it is possible to check, on the basis of position information, time information, movement distance, and the like, whether data falsification is performed with a malicious intent. Therefore, inappropriate data operation by the user can be prevented and a game of competing on the movement distance can be realized fairly and impartially.

The invention as in claim 5 of the present application provides a recording medium storing a movement distance falsification preventing program in a system in which points are added according to a movement distance of a user owning a portable terminal, the program executing acquiring position information of the portable terminal by a position information acquisition unit, acquiring time information by a time information acquisition unit, acquiring successively position information for each predetermined time interval on the basis of the time information and calculating a movement distance by a movement distance calculation unit, and determining, by a determination unit, whether movement is within a range n allowed for a transportation mode assumed on the basis of at least one type of information from among the position information, time information, and the calculated movement distance, and determining that the movement distance is improper when the calculated movement distance is determined not to be within the range allowed for each of the transportation modes.

By using such a recording medium, it is possible to check, on the basis of position information, time information, movement distance, and the like, whether data falsification is performed with a malicious intent in a server communicating with a portable terminal. Therefore, inappropriate data operation by the user can be prevented and a game of competing on the movement distance can be realized fairly and impartially.

The invention as in claim 6 of the present application provides a movement distance falsification preventing system for a system in which points are added according to a movement distance of a user owning a portable terminal, including, a position information acquisition unit which acquires position information and error information of the portable terminal, a time information acquisition unit which acquires time information; and a movement distance calculation unit which records the position information and error information obtained from the position information acquisition unit for each time information obtained from the time information acquisition unit and calculating a movement distance from a difference in position information for each recording timing, wherein a predetermined number of combinations of the position information and the error information associated with the time information are transmitted to an analytical unit at a stage at which the predetermined number of combination sets of at least the position information and the error information associated with the time information are accumulated in a storage unit.

In such a system, the attention is focused on error information (accuracy information) obtained from GPS data and whether or not the falsification has been performed is determined by using the matching of the error information in the data that can be falsified by the user with a malicious intent.

Therefore, inappropriate data operation by the user can be prevented more effectively and a game of competing on the movement distance can be realized fairly and impartially.

The invention as in claim 7 of the present application provides the movement distance falsification preventing system according to claim 6, wherein the analytical unit reads the error information from the plurality of received sets of position information and error information which are associated with the time information and determines that the movement distance is improper when the movement distance calculated by the movement distance calculation unit is equal to or greater than a predetermined distance and the error information of the plurality of sets match.

In such a system, whether or not the falsification has been performed is determined by using the matching of the error information in the data that can be falsified by the user with a malicious intent. Therefore, inappropriate data operation by the user can be prevented more effectively and a game of competing on the movement distance can be realized fairly and impartially.

The invention as in claim 8 of the present application provides the movement distance falsification preventing system according to claim 6, wherein the analytical unit receives as a first combination information a combination of a predetermined number of the position information data and the error information data which are associated with time information, and receives as a second combination information a combination of a predetermined number of the position information data and the error information data which are associated with time information after a predetermined time has elapsed since the reception of the first combination information, sets a first flag when all of the error information data in the first combination information match and determines whether a movement distance that is equal to or greater than a predetermined value is present between the first combination information and the second combination information when all of the error information data in the second combination information match; determines that data are improper when the movement distance equal to or greater than a predetermined value is present, and retains the setting of the first flag when the movement distance equal to or greater than the predetermined value is not present and waits for the reception of a third combination information.

By determining matching or mismatching of error information by comparing two or more sets of combination information, it is possible to make a decision relating to the prevention of falsification more accurately.

In accordance with the present invention, it is possible to prevent inappropriate acquisition of movement distance by improper operations performed by the user in a system in which an added value is acquired according to the movement distance of a portable terminal.

DESCRIPTION OF EMBODIMENT

The embodiments of the present invention will be explained below with reference to the appended drawings.

Figure 1:
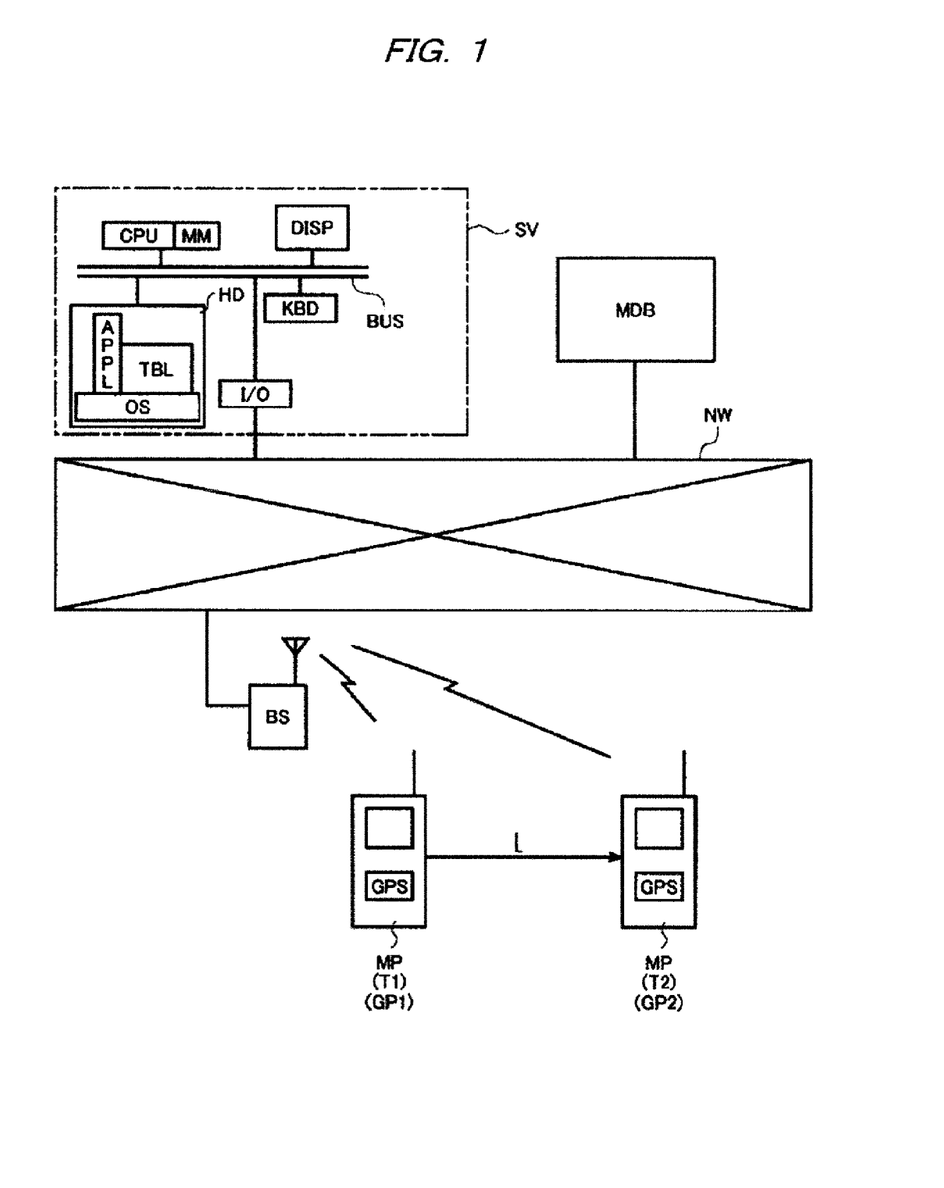
FIG. 1 is a system configuration diagram illustrating an embodiment of the present invention.

FIG. 1 shows a system configuration in an embodiment of the present invention.

As shown in the figure, the system of the present embodiment has a server (SV) connected to a network (NW). The server (SV) is a typical information processing device including a hard disk device (HD) as a large-scale storage device, a display device (DISP) as an output device, a keyboard (KBD) as an input device, and an interface (I/O) for connection to the network (NW) that are connected by a bus (BUS) to a central processing unit (CPU) and a main memory (MM) as a center.

An operating system (OS) and an application program (APPL) are stored on the hard disk device (HD), and functions of the present embodiment are realized by successively executing the application program (APPL) by reading into the main memory (MM) and central processing unit (CPU) via the bus (BUS).

In addition to the application program (APPL), various tables (TBL) such as the below-described user table (see FIG. 2) and a user acquisition position information table (see FIG. 6) are provided on the hard disk device (HD).

In addition to the server (SV), a mobile body database (MDB) that stores information relating to mobile bodies, such as schedules for electric trains, buses, airplanes, and the like, is connected to the network (NW). In the figure, the mobile body database (MDB) is shown connected to the server (SV) via the network, but the mobile body database may be also connected directly by a bus (BUS) to the hard disk device (HD) of the server (SV).

A base station (BS) is connected to the network (NW) and can perform wireless communication with the cellular phone terminal (MP).

The cellular phone terminal (MP) is provided with a position information acquisition function realized by GPS and an internet connection function realized via the base station.

A terminal application program (for example, a program called i-Appli in the case of a terminal of NTT Docomo Co.) is registered in the cellular phone terminal (MP), and position information (latitude-longitude information or XY coordinate information obtained with the GPS) of the cellular phone terminal (MP) is transmitted to the server (SV) via the base station in each predetermined time interval.

In the sever (SV), the position information that has been successively acquired and the acquisition time are recorded in the user acquisition position information table (see FIG. 6) that has been provided on the hard disk device (HD).

The central processing unit (CPU) of the server (SV) calculates a movement distance by the difference between the n-th position information and the (n−1)-th position information for each user, registers the calculated movement distance in the user table (FIG. 2), and assigns points corresponding to the movement distance L to the user of the cellular phone terminal (MP).

Figure 2:
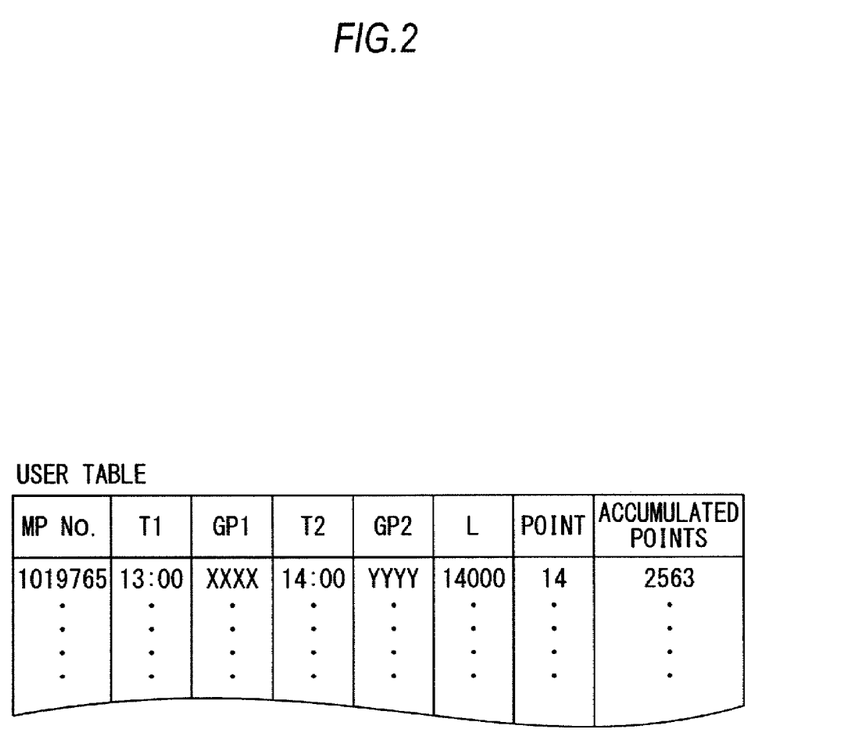
FIG. 2 is an explanatory drawing illustrating the user table of the embodiment.

For example, where the acquisition time of the n-th data is T2, the position information at this time is GP2, the acquisition time of the (n−1)-th data is T1, and the position information at this time is GP1, the movement distance can be calculated as L=GP2−GP1. In this case, since the time information (T1, T2) has also been acquired, the movement speed of the cellular phone terminal can be also calculated. In other words, where T2−T1 is 1 h and the movement distance L is 5 km, the owner of the cellular phone terminal (MP) has moved from the point GP1 to the point GP2 at a speed of 5 km/h and it can be supposed that the owner of the cellular phone terminal moved, for example, by foot.

Figure 4:
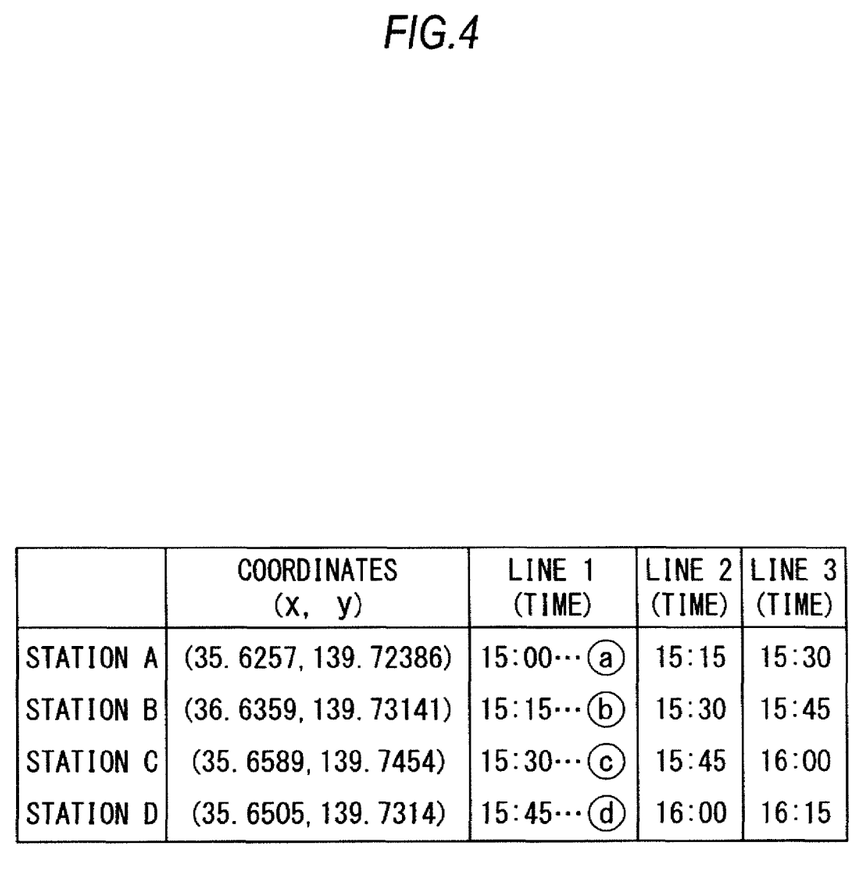
FIG. 4 is an explanatory drawing illustrating a timetable recorded in the mobile body database of the embodiment.
Figure 5:
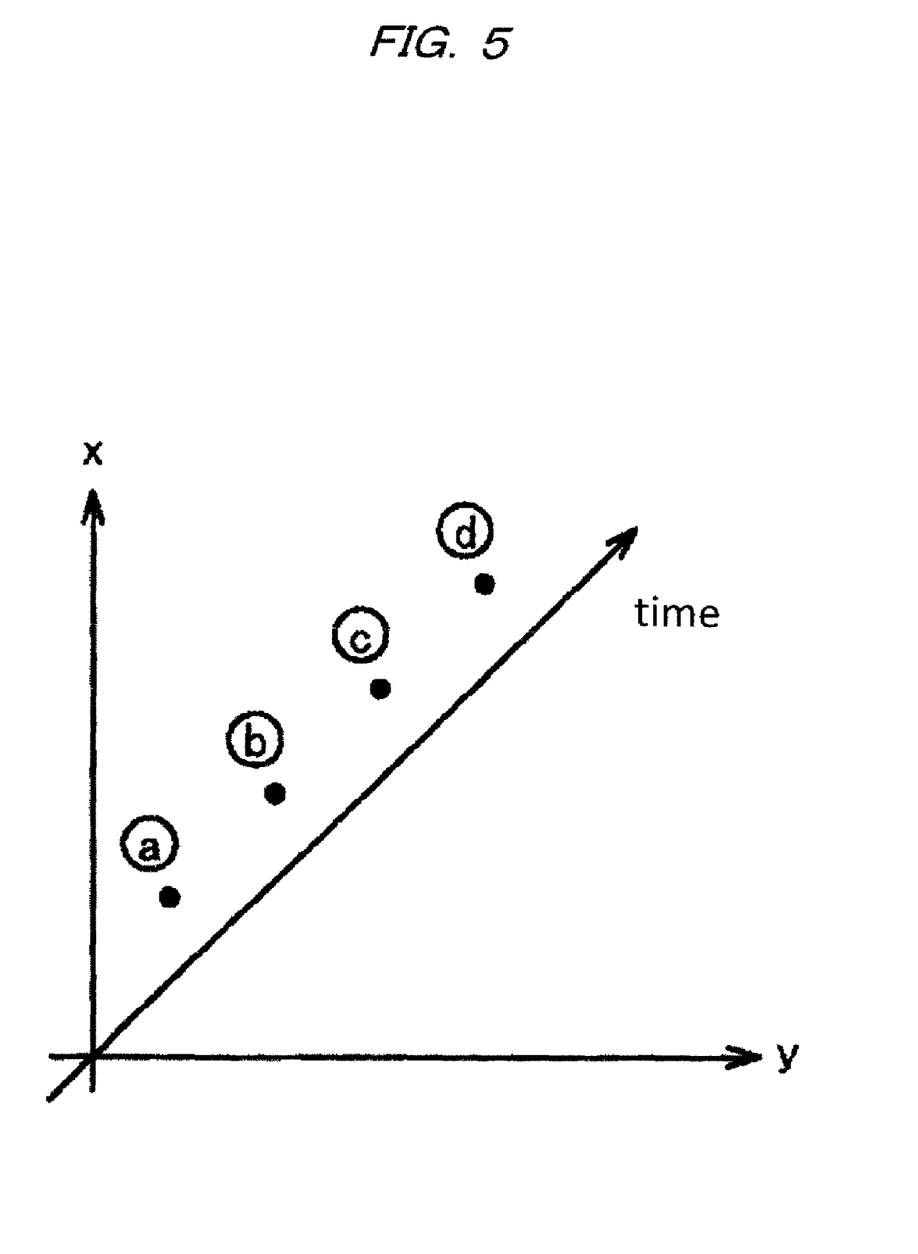
FIG. 5 illustrates an example of line determination on the basis of the timetable of the embodiment.

For example, the timetable of railroad station, such as shown in FIG. 4, is recorded in the mobile body database (MBD), and the station name, position information (latitude-longitude information, XY coordinates) of the station, and train line information having recorded therein the departure time for a plurality of train lines of the station are recorded in the timetable in association with each other. Therefore, when the position information detected in the (n−1)-th cycle is in the vicinity of the predetermined departure station, the position information detected in the n-th cycle is in the vicinity of the predetermined arrival station, and the movement at a speed of 60 km/h is detected, movement by train can be supposed. More specifically, when the information of the (n−1)-th cycle has been acquired at 10:00 AM in the vicinity of the Tokyo station and the information of the n-th cycle has been acquired at 12:00 AM in the vicinity of Nagoya station, the cellular phone terminal owner can be supposed to have traveled by a Shinkansen train line.

However, when the information of the (n−1)-th cycle has been acquired at 11:00 PM in the vicinity of the Tokyo station and the information of the n-th cycle has been acquired at 1:00 AM in the vicinity of Nagoya station, since this time zone is not the operation interval of the Shinkansen train line (interval between the last evening train and first morning train), the movement is supposed not to be performed by the Shinkansen train line. Further, since this time is not a flight time of an airplane, the movement cannot be supposed to be performed by an airplane.

The average travel time (may be also the average travel speed) between highway interchanges (between the departure interchange and arrival interchange) is also registered in the mobile body database (MDB) (time calculation table for automobiles). For example, in the aforementioned example, the distance between Tokyo and Nagoya is about 400 km, but even if the owner travels in an automobile by using the Tokyo-Nagoya highway, the average travel speed should be 200 km/h which is unreal. Therefore, according to the mobile body database, the aforementioned data do not correspond to any of the tables that can be referred to and therefore it can be determined that the position information with the cellular phone terminal (MP) is acquired improperly.

Figure 3:
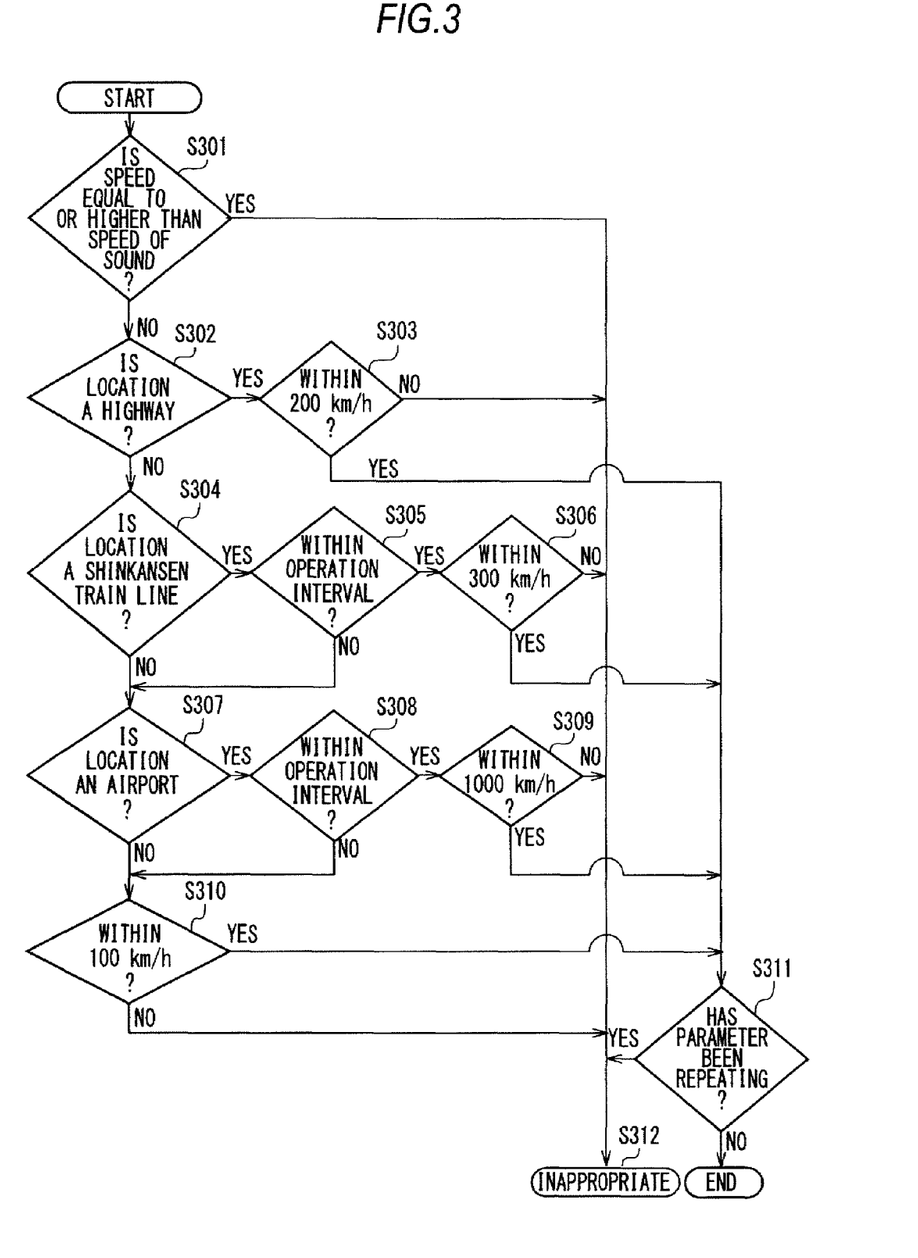
FIG. 3 is a flowchart illustrating the processing sequence in the server of the embodiment.

This will be explained below in greater detail with reference to FIG. 3.

Where the central processing unit (CPU) of the server (SV) receives the n-th position information and time information from the cellular phone terminal (MP), the central processing unit reads the (n−1)-th position information and time information on the basis of the acquired position information table for each user and computes the movement distance L and movement speed (km/h).

First, it is determined whether the movement speed is higher than the speed of sound (1225 km/h) (step S301). When the movement speed in excess of the speed of sound has been calculated, it is determined that the position information from the cellular phone terminal (MP) has been acquired improperly (step S312).

Then, the n-th position information and (n−1)-th position information are used to determine, with reference to the time calculation table for automobiles of the mobile body database (MDB) mentioned hereinabove, whether the movement has been performed by using a highway, and when it is determined on the basis of the position information that the movement has been performed on the highway (step S302), a movement speed from the (n−1)-th position to the n-th position is read, and when the movement is performed at a speed of equal to or less than 200 km (step S303), the data are assumed not to be improper and the processing flow advances to the determination of step S311.

When the movement speed exceeds 200 km/h in step S303, the data are determined to be improper (step S312).

When the movement is determined in step S302 to be performed not on the highway, it is determined, with reference to the timetable of the mobile body database (MDB), whether or not the movement is performed by the Shinkasen train line (step S304). In this case, when the movement is determined to be performed not in the operation interval of the Shinkasen train line, the processing flow advances to the next step S307. However, when the movement is determined to be performed within the operation interval of the Shinkasen train line, it is determined whether the movement is performed at a speed in excess of 300 km/h (step S306). Where the movement speed is equal to or higher than 300 km/h, the data are determined to be improper (step S312), and where the movement is performed at a speed equal to or less than 300 km/h, the processing flow advances to the determination of the next step S311.

When the movement is determined in step S304 not to be performed via the Shinkansen train line, it is determined whether the movement is performed by an airplane (steps S307, S308). In this case, too, when the movement is performed within the operation interval (step S308), it is determined whether the movement is performed at a speed higher than 1000 km/h or at a lower speed (step S309). Where the movement is performed at a speed higher than 1000 km/h, the data are determined to be improper (step S309), and where the movement speed is equal to or less than 1000 km/h, the processing flow advances to the determination in step S311.

Where the movement is determined in step S307 to be performed not by an airplane, it is determined whether the movement speed is equal to or less than 100 km/h, and where the movement speed is determined to be higher than 100 km/h, the data are determined to be improper. Thus, since the movement at a speed higher than 100 km/h can be assume to be performed only by an automobile, a Shinkansen train line, or an airplane, the acquisition of position information by presuming such a movement can be determined to be improper. However, where the movement speed is equal to or less than 100 km/h, the processing flow advances to the determination of step S311.

In step S311, it is determined whether parameter repetition is performed.

At this time, the central processing unit (CPU) refers to the acquisition position information table for each user and determines whether the same parameter, that is, the same or close latitude and longitude have repeatedly appeared in each predetermined time interval.

Figure 6:
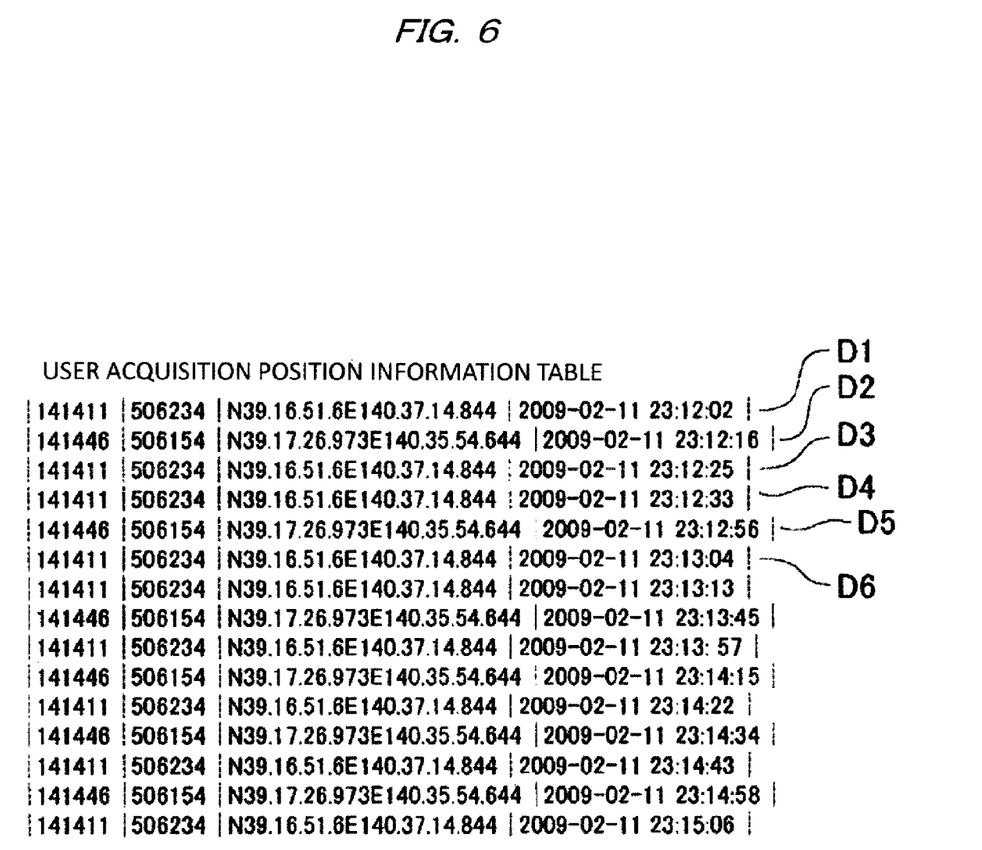
FIG. 6 illustrates the acquisition position information table for the user of the embodiment.

More specifically, as shown in FIG. 6, the same latitude-longitude information has appeared at D1, D3, D4, and D6, and different latitude-longitude information has appeared in the intervals therebetween (D2, D5).

In the case in which identical or similar parameters repeatedly appear in each predetermined interval, it is highly probable that the acquired position information has been produced by improper operation of the owner of the cellular phone terminal. Therefore, in this case, the data are determined to be improper (steps S311, S312).

As described hereinabove, in the present embodiment, an improper action can be determined by registering timetable information and speed information assumed for each mobile body in a mobile body database (MDB) and assuming a mobile body with reference to this information.

The cellular phone terminal (MP) provided with a GPS function is explained hereinabove by way of example as a portable terminal, but such selection is not limiting and a FDA (Personal Data Assistant) provided with a GPS function may be also used. Further, a system in which a GPS device and a portable terminal are separated may be also used. In this case, the portable terminal may be a PDA, a personal computer, or the like.

Further, the time information (timing information) is assumed to be transmitted from the cellular phone terminal (MP), but the server (SV) may perform time authentication when GPS information is received.

Furthermore, electronic points are assumed to be added according to the distance, but mileage or virtual currency may be also used.

The configuration in which GPS is used to acquire positional information is explained, but position recognition may be also performed by a base station (BS) that recognizes the cellular phone terminal (MP), and position recognition may be also performed by transit information taken when the cellular phone terminal (MP) provided with a clearing function of means of transportation (for example, "Suica" (trade name of JR East)) passes the ticket gate, or position information may be used that is obtained when information is acquired by the cellular phone terminal (MP) provided with a RFID function.

Figure 7:
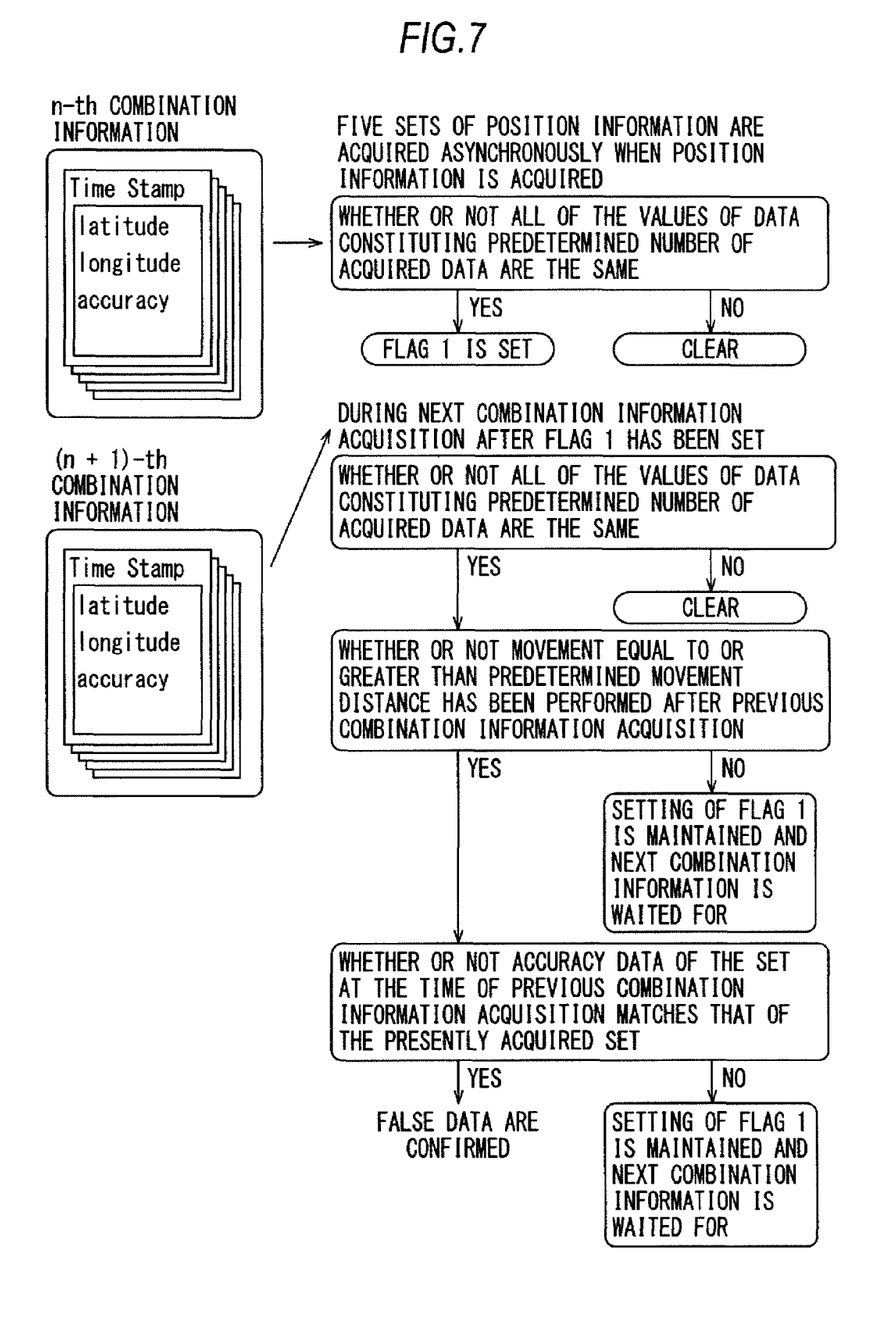
FIG. 7 is a flowchart illustrating the server processing sequence during the acquisition of a plurality of position information data of the embodiment.
Figure 8:
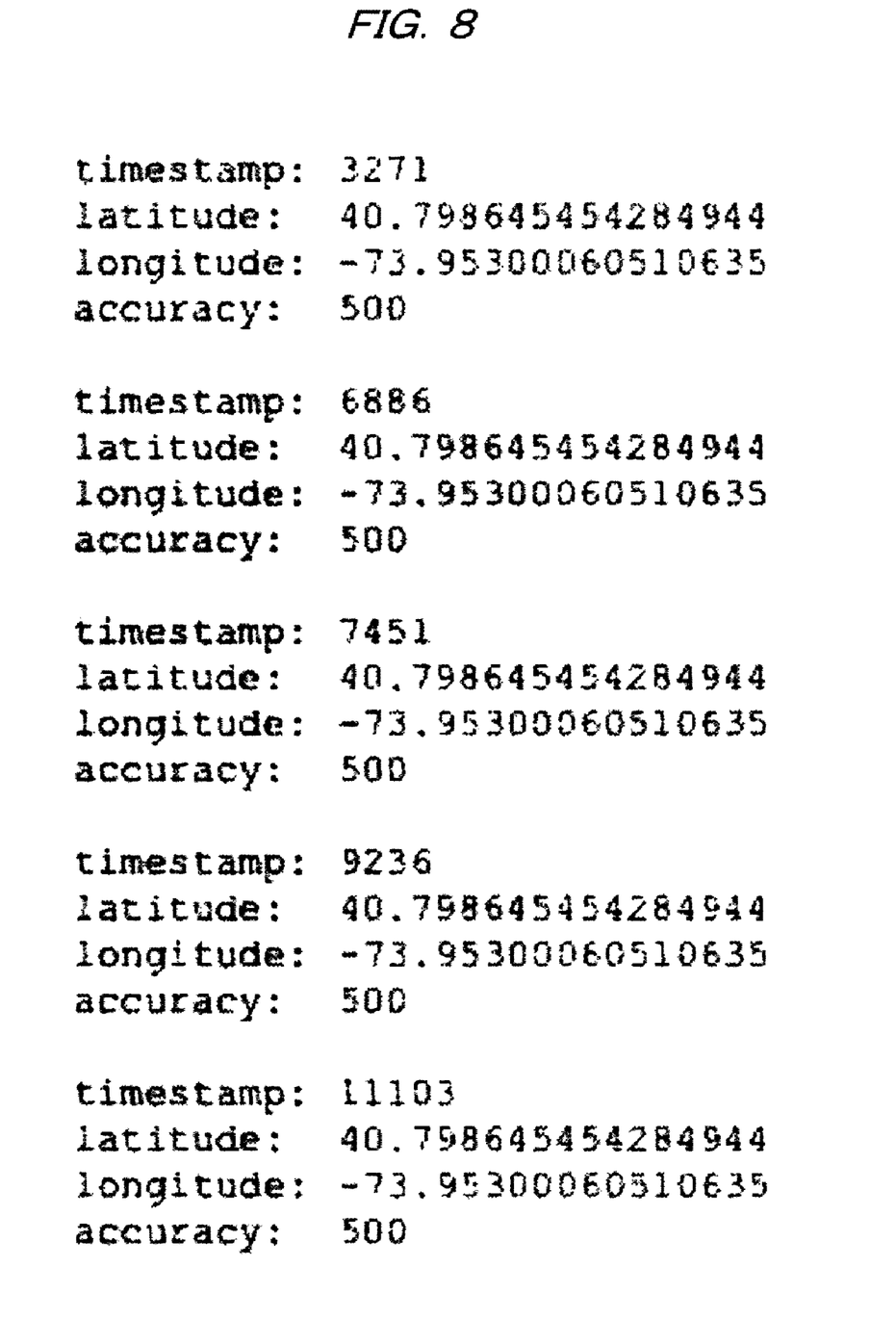
FIG. 8 is an explanatory drawing illustrating a state in which the position information associated with the time information of the embodiment includes no error information and all of the position information data match.
Figure 9:
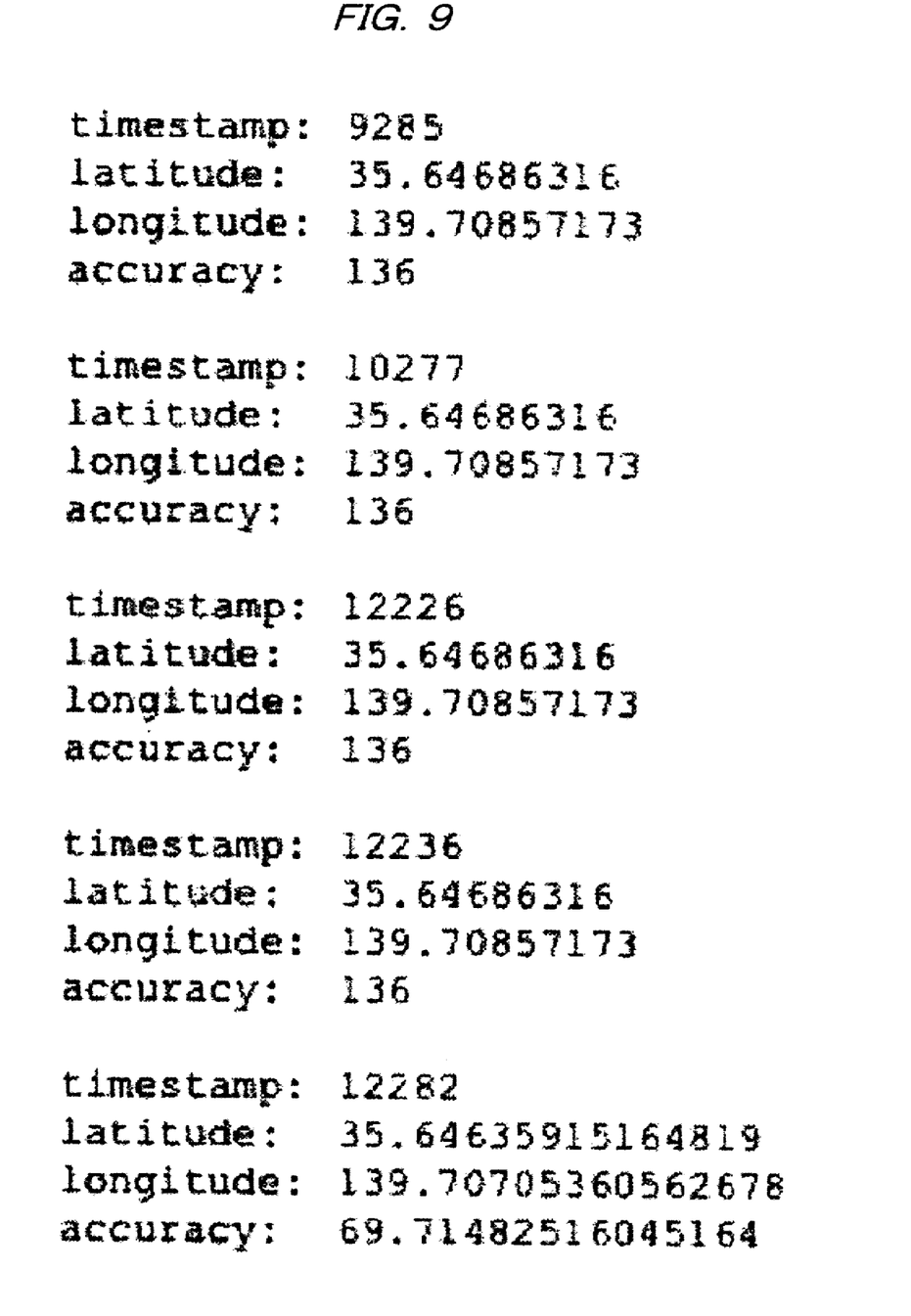
FIG. 9 is an explanatory drawing illustrating a state in which the position information associated with the time information of the embodiment includes error information and all of the position information data do not match.

The present invention is explained above on the basis of an embodiment thereof, but the present invention is not limited to this embodiment. For example, the falsification preventing method such as illustrated by FIGS. 7 to 9 can be also used. This method is explained below in greater detail.

A cellular phone terminal (MP) provided with a GPS function generates as the first combination information a plurality of combinations of a predetermined number of the position information data and error information data which are associated with time information. More specifically, in a Web application program that is realized by a server and a portable terminal such as an i-mode terminal (trade name of NTT Docomo Co.), the application program acquires autonomously, in a plurality of cycles, the position information (Latitude, Longitude) and error information (Accuracy) from a GPS system. In the acquisition of the position thereof and error information, when the user intentionally starts the GPS system of the portable terminal and performs the operation of sending the position information and error information to a server (SV) (timestamp operation), a plurality of accumulated sets of position information and error information may be transmitted to the server, or a plurality of sets of position information and error information that have been successively acquired after the timestamp operation of the user may be transmitted to the server.

In FIG. 7, for example, the first combination information is transmitted to the analytical means of the server (SV) and recorded as the first combination information at a stage at which a plurality of sets in the first combination information have been accumulated in the storage means in a predetermined number of sets.

In the server that has received the combination information via the network, the analytical means realized by the server program initially determines whether or not all of the error information data match, as shown in FIG. 8, from among the values (values latitude information (Latitude), longitude information (Longitude), and error information (Accuracy)) of the data constituting the predetermined number of position information data associated with the time information that have been received as the first combination information.

In the normal case (the method used by the user who does not perform inappropriate operations), all of the values, in particular all of the error information data, do not exactly match and a difference such as shown in FIG. 9 typically appears between the values of data constituting the predetermined number of position information data. By contrast, when all of the error information data in the first combination information (in this case, the numerical value "500") match as shown in FIG. 8, it is highly probable that the user has fabricated the latitude information and longitude information from the same data, practically without operating even the error information.

Therefore, when the error information data match, it is possible that the data are inappropriate and a Flag 1 is set for the user.

Then, the Web application program in the cellular phone terminal (MP) generates as the second combination information a combination of the predetermined number of the position information data and error information data which are associated with time information after the predetermined time has elapsed and transmits the second combination information to the server (SV) via the network at a stage at which a plurality of sets have been accumulated in the storage means in a predetermined number of sets.

In the server (SV) that has received the second combination information, the analytical means realized by the server program is started and it is determined whether all of the error information data match with reference to the predetermined number of position information data and error information data which are associated with time information in the transmitted second combination information, in the same manner as with the above-described first combination information. Where all of the error information data do not match, Flag 1 that has been set is cleared and the movement distance is calculated from the difference between the position information of the first combination information and the position information of the second combination information.

However, when all of the error information data of the second combination information match, it is determined, from the position information acquired in the fist combination information, whether or not the movement distance is equal to or greater than the predetermined value. When the movement distance is not equal to or greater than the predetermined value, the setting of Flag 1 is maintained (retained) and a similar analysis is performed when the position information of the next cycle is acquired.

When the movement distance equal to or greater than the predetermined value has been detected, it is determined whether the error information constituting the second combination information matches the error information in the first combination information. When the information does not match, the setting of Flag 1 is maintained, the movement distance is calculated from the difference between the position information of the first combination information and the second combination information and a similar analysis is performed when the position information of the next cycle is acquired.

When the error information constituting the first combination information matches the error information constituting the second combination information, it is determined that the position information from the cellular phone terminal (MP) has been acquired improperly.

The present invention can be used in a system in which position recognition is based on a GPS or base station information and points corresponding to the movement distance are added.

What is claimed is:

1. A movement distance falsification preventing system for a system in which points are added according to a movement distance of a user owning a portable terminal,
the movement distance falsification preventing system, comprising:
a position information acquisition unit which acquires position information of the portable terminal;
a time information acquisition unit which acquires time information;
a movement distance calculation unit which successively acquires position information from the position information acquisition unit for each predetermined time interval on the basis of the time information obtained from the time information acquisition unit and calculates a movement distance; and
a determination unit which determines whether the calculated movement distance is within a range allowed for a transportation mode assumed on the basis of the position information, the time information, and the calculated movement distance,
wherein when the determination unit determines that the calculated movement distance is not within the range allowed for any of the transportation modes, the determination unit determines that the movement distance is improper, and
wherein the determination unit detects whether or not same or close values of a parameter to be added to the position information obtained from the position information acquisition unit appear repeatedly for every predetermined number of information acquisitions, and determines that the movement distance is improper when the repeated appearance of same or close values has been detected.

2. A movement distance falsification preventing system for a system in which points are added according to a movement distance of a user owning a portable terminal,
the movement distance falsification preventing system, comprising:
a position information acquisition unit which acquires position information of the portable terminal;
a time information acquisition unit which acquires time information;
a movement distance calculation unit which successively acquires position information from the position information acquisition unit for each predetermined time interval on the basis of the time information obtained from the time information acquisition unit and calculates a movement distance; and
a determination unit which detects whether or not same or close values of a parameter to be added to the position information obtained from the position information acquisition unit appear repeatedly for every predetermined number of information acquisitions, and determines that the movement distance is improper when the repeated appearance of same or close values has been detected.

3. A movement distance falsification preventing method in a system in which points are added according to a movement distance of a user owning a portable terminal, the method, by which the system executes:
acquiring time information;
acquiring successively position information of the portable terminal for each predetermined time interval on the basis of the time information;
calculating a movement distance from the acquired position information for the each predetermined time interval; and
determining whether the calculated movement distance is improper,
wherein the system executes determining whether the calculated movement distance is within a range allowed for a transportation mode assumed on the basis of the position information, the time information, and the calculated movement distance, and determining that the movement distance is improper when the calculated movement distance is determined not to be within the range allowed for each of the transportation modes in the determining whether the calculated movement distance is improper, and
wherein the system executes detecting whether or not the same or close values of a parameter to be added to the acquired position information appear repeatedly for every predetermined number of information acquisitions, and determining that the movement distance is improper when the repeated appearance of same or close values has been detected in the determining whether the calculated movement distance is improper.

4. A non-transitory computer-readable medium storing a movement distance falsification preventing program in a system in which points are added according to a movement distance of a user owning a portable terminal,
the program causing the system to execute:
acquiring time information;
acquiring successively position information of the portable terminal for each predetermined time interval on the basis of the time information;
calculating a movement distance from the acquired position information for the each predetermined time interval; and
determining whether the calculated movement distance is improper,
wherein the program causing the system to execute determining whether the calculated movement distance is within a range allowed for a transportation modes assumed on the basis of at least one type of information from among the position information, time information, and the calculated movement distance, and determining that the movement distance is improper when the calculated movement distance is determined not to be within the range allowed for each of the transportation modes in the determining whether the calculated movement is improper, and
wherein the program causing the system to execute detecting whether or not same or close values of a parameter to be added to the acquired position information appear repeatedly for every predetermined number of information acquisitions, and determining that the movement distance is improper when the repeated appearance of same or close values has been detected in the determining whether the calculated movement distance is improper.

5. A movement distance falsification preventing system for a system in which points are added according to a movement distance of a user owning a portable terminal,
the movement distance falsification preventing system, comprising:
a position information acquisition unit which acquires position information and error information of the portable terminal;
a time information acquisition unit which acquires time information;
a movement distance calculation unit which records the position information and error information obtained from the position information acquisition unit for each time information obtained from the time information acquisition unit and calculates a movement distance from a difference in position information for each recording timing; and
a transmission unit which transmits a predetermined number of combinations of the position information and the error information associated with the time information to an analytical unit at a stage at which the predetermined number of combination sets of at least the position information and the error information associated with the time information are accumulated in a storage unit,
wherein the analytical unit reads the error information from the plurality of received sets of the position information and error information which are associated with time information and determines that the movement distance is improper when the movement distance calculated by the movement distance calculation unit is equal to or greater than a predetermined distance and the error information of the plurality of sets match.

6. The movement distance falsification preventing system according to claim 5, wherein
the analytical unit receives as a first combination information a combination of a predetermined number of the position information data and the error information data which are associated with time information, and receives as a second combination information a combination of a predetermined number of the position information data and the error information data which are associated with time information after a predetermined time has elapsed since the reception of the first combination information;
sets a first flag when all of the error information data in the first combination information match and determines whether a movement distance that is equal to or greater than a predetermined value is present between the first combination information and the second combination information when all of the error information data in the second combination information match;
determines that data are improper when the movement distance equal to or greater than a predetermined value is present; and
retains the setting of the first flag when the movement distance equal to or greater than the predetermined value is not present and waits for the reception of a third combination information.

7. A movement distance falsification preventing method in a system in which points are added according to a movement distance of a user owning a portable terminal,
the method by which the system executes:
acquiring time information;
acquiring successively position information of the portable terminal for each predetermined time interval on the basis of the time information;
calculating a movement distance from the acquired position information for the each predetermined time interval;
detecting whether or not same or close values of a parameter to be added to the acquired position information appear repeatedly for every predetermined number of information acquisitions; and determining that the movement distance is improper when the repeated appearance of same or close values has been detected.

8. A non-transitory computer-readable medium storing movement distance falsification preventing program in a system in which points are added according to a movement distance of a user owning a portable terminal, the program causing the system to execute:

acquiring time information;

acquiring successively position information of the portable terminal for each predetermined time interval on the basis of the time information;

calculating a movement distance from the acquired position information for the each predetermined time interval;

detecting whether or not same or close values of a parameter to be added to the acquired position information appear repeatedly for every predetermined number of information acquisitions; and determining that the movement distance is improper when the repeated appearance of same or close values has been detected.

* * * * *